O. M. Pond.
Seeding Machine & Cultivator.
Nº 75575.  Patented Mar. 17, 1868.
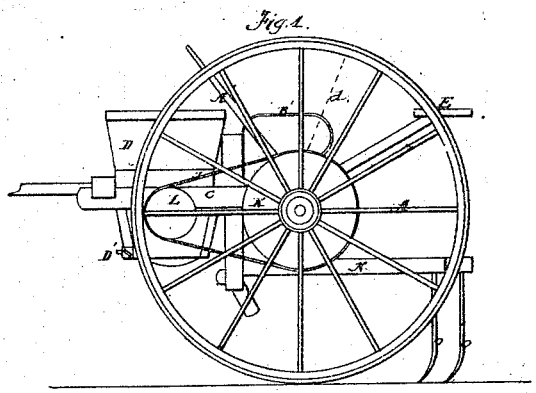
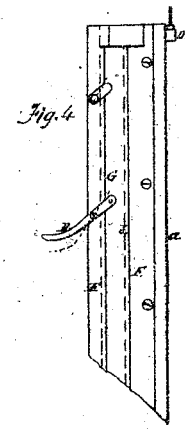
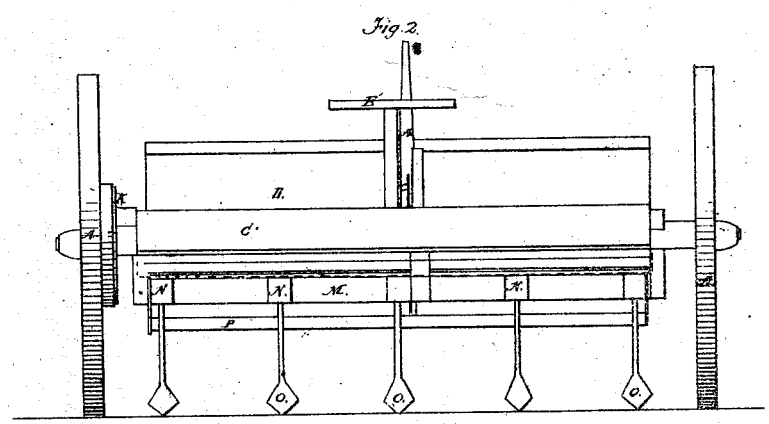
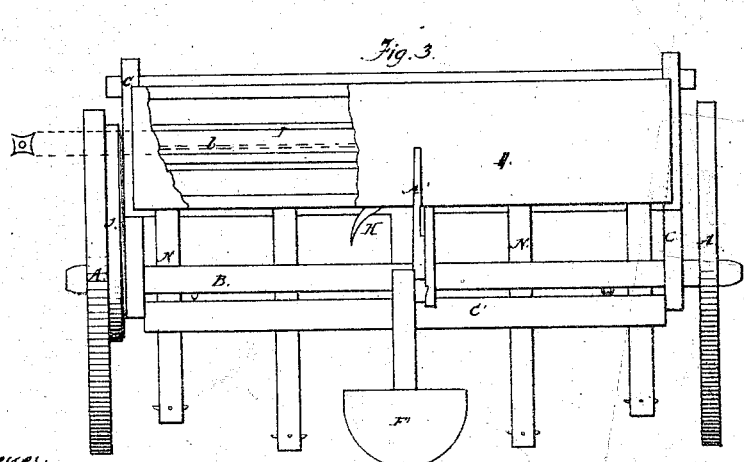
Witnesses:
J. H. Burridge
J. Holmes
Inventor:
O. M. Pond

United States Patent Office.

O. M. POND, OF INDEPENDENCE, IOWA.

Letters Patent No. 75,575, dated March 17, 1868.

---

IMPROVEMENT IN COMBINED SEEDING-MACHINE AND CULTIVATOR.

---

The Schedule referred to in these Letters Patent and making part of the same.

---

TO ALL WHOM IT MAY CONCERN:

Be it known that I, O. M. POND, of Independence, in the county of Buchanan, and State of Iowa, have invented certain new and useful Improvements in a Combined Seeding-Machine and Cultivator; and I do hereby declare that the following is a full and complete description of the construction and operation of the same, reference being had to the accompanying drawings, making a part of this specification, in which—

Figure 1 is an end view of the seeder.
Figure 2 is a view of the rear side.
Figure 3 is a top view.
Figure 4 is a detached section.

Like letters of reference refer to like parts in the views.

On the wheels A, fig. 3, is mounted the axle-tree B, to which is attached a frame, C; in said frame is placed and secured a seed-box, D, the bottom of which is composed of two parts, E F, fig. 4. Part E is fixed rigidly to the box, whereas part F is adjustable, so that it can be moved back from E, more or less, as indicated by the dotted lines $a$, thereby making a longitudinal opening, $b$, along the bottom, of greater or less capacity, for a purpose hereafter shown. G is a slide by which the opening referred to may be closed, and which is operated by the lever H. At the bottom of the box is journalled, in the ends of the same, a square fluted feed-roller, I, figs. 3 and 4, which is made to revolve by a belt, J, running from the pulley K to L, the pulley K being attached to and driven by the wheel A. To the under side of the frame C is attached a shaft, M, fig. 2, from which proceed the arms N. To the extreme ends of said arms are fixed the cultivator-teeth O, which, when the machine is in use, are in the position shown in fig. 1. These teeth may be lifted entirely from the ground by the adjustable rail P, fig. 3, extending across the machine immediately under the arms, said rail being attached to a lever, A', by a cord, $c$, and by which it and the cultivators are raised upward by pulling the lever back to the position indicated by the dotted lines $d$, fig. 1, and is retained in this position by slipping the lever into a notch cut into the side of the frame B'. C', fig. 3, is a check-bar hinged to the axle-tree, which, on being let down as indicated by the dotted lines $a'$, fig. 2, reaches to the top of the arms N, and thereby prevents the arms and cultivator from being thrown up out of the ground while the machine is in operation; hence the teeth are held firmly into the ground, and at any desired depth, by raising or lowering the check more or less, as is necessary.

The practical use of this machine is for sowing grain, grass-seeds, &c., broadcast, and is performed as follows:

The seed is thrown into the box, the bottom of which is then opened more or less, according to the kind of seed, by means of the adjusting-screws D', fig. 1, or in order to gauge the amount to be sown to the acre. The operator takes his place upon the seat E', and on starting moves the slide G, by means of the lever H, from the adjusted opening in the bottom of the seed-box. As the machine moves forward, dropping the seed, it is raked in by the cultivators O, to a greater or less depth, according to the adjustment of the check-bar referred to.

The bottom of the box is made slightly dishing, by which, and by means of the roller I, all the seed is made to run out, so that there is no lodgment of the grain in the corners of the box, and at the same time secures a uniformity in the discharge of seed to the ground, so that the sowing is evenly and regularly performed, with much less labor, and more expeditiously than by hand.

What I claim as my improvement, and desire to secure by Letters Patent, is—

1. The seed-box D, provided with an adjustable bottom, E F, and slide G, in combination with the fluted feed-roller I, for the purpose and in the manner as set forth.

2. The cultivators O, adjusting-bar P, check-bar C', as constructed and arranged to operate in relation to the seed-box D, for the purpose substantially as described.

O. M. POND.

Witnesses:
    JOHN HOLLETT,
    D. D. HOLDRIDGE.